United States Patent
Tsuchiya et al.

(10) Patent No.: US 9,434,037 B2
(45) Date of Patent: Sep. 6, 2016

(54) PALLET CHANGER FOR A MACHINE TOOL, A PALLET CHANGING METHOD AND A MACHINE TOOL

(75) Inventors: Yuichiro Tsuchiya, Minamitsuru-Gun (JP); Kentaro Ozone, Minamitsuru-Gun (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 280 days.

(21) Appl. No.: 14/344,822

(22) PCT Filed: Sep. 16, 2011

(86) PCT No.: PCT/JP2011/071283
§ 371 (c)(1),
(2), (4) Date: Mar. 13, 2014

(87) PCT Pub. No.: WO2013/038568
PCT Pub. Date: Mar. 21, 2013

(65) Prior Publication Data
US 2014/0338163 A1    Nov. 20, 2014

(51) Int. Cl.
*B23Q 1/66* (2006.01)
*B23Q 7/14* (2006.01)
(Continued)

(52) U.S. Cl.
CPC . *B23Q 1/66* (2013.01); *B23Q 7/04* (2013.01); *B23Q 7/043* (2013.01); *B23Q 7/048* (2013.01);
(Continued)

(58) Field of Classification Search
CPC .................. B23Q 1/66; B23Q 7/1431; Y10T 409/30532; Y10T 409/305432; Y10T 409/306048; Y10T 409/306104; Y10T 29/5196; Y10T 29/5124; Y10T 483/16; Y10T 483/165

USPC .................. 29/33 P, 563; 198/345.3, 346.1; 409/159, 161, 172, 173; 483/14, 15
See application file for complete search history.

(56) References Cited

U.S. PATENT DOCUMENTS 3,550,487 A    12/1970 Randall et al.
4,644,635 A *    2/1987 Murai .................. B23Q 1/54
                                                        269/71
(Continued)

FOREIGN PATENT DOCUMENTS

DE    3541600        5/1987
DE    19728580 A1 *  1/1998    ............ B23Q 1/52
(Continued)

OTHER PUBLICATIONS

JPO Machine Translation of JP 7171730 A: Okada et al., "Pallet Magazine for Machining Center," Dec. 20, 1993.*
(Continued)

*Primary Examiner* — Erica E Cadugan
*Assistant Examiner* — Michael Vitale
(74) *Attorney, Agent, or Firm* — Morrison & Foerster LLP

(57) ABSTRACT

The method that exchanges pallets (118) between a table (116) and a pallet loading station (14) of a machine tool is configured so that the lower edge (122) of a pallet (A) installed on the table (116) is grasped by the leading edge portion (17) of a first arm (16a) of the exchanging arm (16) and the one side (122) of a pallet (B), which is disposed on the pallet loading station (14), that will become the lower edge when the pallet is installed on the table (116) is grasped by the leading edge portion (17) of a second arm (16b) of the exchanging arm (16), and the exchanging arm (16) is rotated 180° around an inclined axis (O) that extends 45° upward from a horizontal axis in a vertical plane that contains the axis of rotation (Os) of the main axis (108).

10 Claims, 9 Drawing Sheets

(51) Int. Cl.
*B23Q 7/04* (2006.01)
*B65G 25/04* (2006.01)

(52) U.S. Cl.
CPC .......... *B23Q 7/1431* (2013.01); *B23Q 7/1494* (2013.01); *B65G 25/04* (2013.01); *Y10T 29/5124* (2015.01); *Y10T 29/5176* (2015.01); *Y10T 29/5196* (2015.01); *Y10T 409/30532* (2015.01); *Y10T 409/306048* (2015.01)

(56) References Cited

U.S. PATENT DOCUMENTS

| | | | | |
|---|---|---|---|---|
| 4,664,570 | A | * | 5/1987 | Tsukiji ................... G05B 19/41 409/132 |
| 6,647,605 | B2 | | 11/2003 | Hiramoto et al. |
| 6,938,312 | B2 | * | 9/2005 | Kitaura ................ B23Q 1/0018 269/63 |

FOREIGN PATENT DOCUMENTS

| | | |
|---|---|---|
| FR | 2916663 | 12/2008 |
| GB | 1324830 | 7/1973 |
| GB | 2 084 909 | 4/1982 |
| JP | 57-107713 | 7/1982 |
| JP | 62-44343 | 2/1987 |
| JP | 4-5339 | 1/1992 |
| JP | 07060589 A * | 3/1995 |
| JP | 7-171730 | 7/1995 |
| JP | H-8-294840 | 11/1996 |
| JP | 10-6168 | 1/1998 |
| WO | WO-02/14013 | 2/2002 |

OTHER PUBLICATIONS

Partial Supplementary Search Report mailed Jan. 30, 2015, directed towards European Application No. 11872376.6, 5 pages.

International Search Report dated Nov. 8, 2011, directed to International Application No. PCT/JP2011/071283; 2 pages.

Extended Search Report mailed Jun. 19, 2015, directed to European Application No. 11872376.6, 7 pages.

* cited by examiner

PALLET CHANGING FLOW

US 9,434,037 B2

PALLET CHANGER FOR A MACHINE TOOL, A PALLET CHANGING METHOD AND A MACHINE TOOL

REFERENCE TO RELATED APPLICATION

This application is the national stage application under 35 USC 371 of International Application No. PCT/JP2011/071283, filed Sep. 16, 2011, the entire contents of which are incorporated herein by reference.

FIELD OF THE INVENTION

The invention relates to a pallet changer and a pallet changing method for changing a pallet vertically attached to a table with a pallet horizontally disposed at a pallet loading station, and to a machine tool provided with the pallet changer.

BACKGROUND OF THE INVENTION

In the field of machine tools, a workpiece is conventionally attached to a pallet which is detachably attached to a table of a machine tool whereby the workpiece is processed. In such machine tools, a non-processed workpiece and a processed workpiece, each attached to a pallet, are exchanged with each other by a pallet changer.

Patent Document 1, for example, discloses a pallet changer which is provided with an arm member, rotatable about an axis inclined by 45 degrees relative to a horizontal plane. The arm member has a pair of pallet supports, symmetrically disposed relative to the inclined axis of the arm member, whereby the rotation of the arm member exchanges the pallet supports between a pallet changing position and a work changing position.

Patent Document 1: Japanese Unexamined Patent Publication No. H07-171730

SUMMARY OF THE INVENTION

In the pallet changer described in Patent Document 1, the pallet is attached to the pallet support by fitting a projection provided on the pallet support into a dovetail groove provided in the pallet. However, coupling a pallet and a pallet support by a projection and a dovetail groove, as the pallet changer of Patent Document 1, has the problem that it takes relatively a long time to transport a pallet between the pallet support and a table of the machine tool. Further, it requires increased weight of the pallet and the arm member. Furthermore, in the pallet changer of Patent Document 1, when changing a non-processed workpiece and a processed workpiece with each other, the arm member must be horizontally (X-axis direction) reciprocated twice along with a heavy arm base, which further increases the time for changing the pallets.

The invention is directed to solve the problems in the prior art, and the objective of the invention is to provide a pallet changer, a pallet changing method and a machine tool which can quickly change a pallet vertically attached to a table with a pallet horizontally disposed at a pallet loading station securely and quickly by a simple configuration and a compact movement. Further, the objective of the invention is to provide a pallet changer, a pallet changing method and a machine tool which allow use of light weight pallets in the form of flat and simple plates.

According to the invention, there is provided a pallet changer for changing pallets between a table to which a pallet is vertically mounted and a pallet loading station in which a pallet is held horizontally, comprising: a changing arm provided for rotation between the table and the pallet loading station about a rotational axis upwardly inclined relative to a horizontal axis by 45 degrees; and two arm portions, provided at the either end of the changing arm, for gripping gripped members, each of the gripped members being disposed on a side of the pallet, which side is positioned at a lower end of the pallet when the pallet is vertically oriented.

Further, according to the invention, there is provided a pallet changing method of changing pallets between a table to which a pallet is vertically mounted and a pallet loading station in which a pallet is held horizontally, characterized by the steps of: gripping a lower end of the pallet mounted to the table by a first arm portion of a changing arm; gripping one side of the pallet which is positioned in the pallet loading station by a second arm portion of the changing arm, the one side becoming the lower end when the pallet is mounted to the table; and rotating the changing arm by 180 degrees about a rotational axis upwardly inclined relative to a horizontal axis by 45 degrees.

Further, according to the invention, there is provided a machine tool, comprising: a spindle held for rotation about a horizontal rotational axis; a table, provided so as to be able to face the spindle, for mounting a vertically oriented pallet to which a workpiece is attached; means for linearly feeding the table and the spindle relative to each other along three orthogonal axes; means for rotationally feeding the table about a vertical axis; and a pallet loading station for attaching a non-processed workpiece to a horizontally held pallet and detaching a processed workpiece from the pallet;

the machine tool further comprising a changing arm having first and second arm portions at either end thereof, and provided to grip one end of the pallets and rotate about a rotational axis upwardly inclined relative to a horizontal axis by 45 degrees between the table side position, where the changing arm faces to the table, and the pallet loading station, the one side becoming the lower end when the pallet is mounted to the table.

According to the invention, during the rotational movement of the changing arm, the gripped members of the pallets are biased against the arm portions by the gravity applied to the pallets, except when the pallet is horizontally oriented in the pallet loading station. Therefore, if the pallet changing operation is normally carried out, the pallets cannot be disengaged from the pallet gripping parts. Therefore, the pallet changing operation has a simple configuration, i.e., gripping one side of the pallets with the changing arm. The other functional operation and the advantageous effect of the present invention will be apparent from the description of the following mode for carrying out the invention.

DETAILED DESCRIPTION OF THE INVENTION

With reference to FIGS. 1-10, an embodiment of a machining center according to the invention will be described below.

Figure 1:
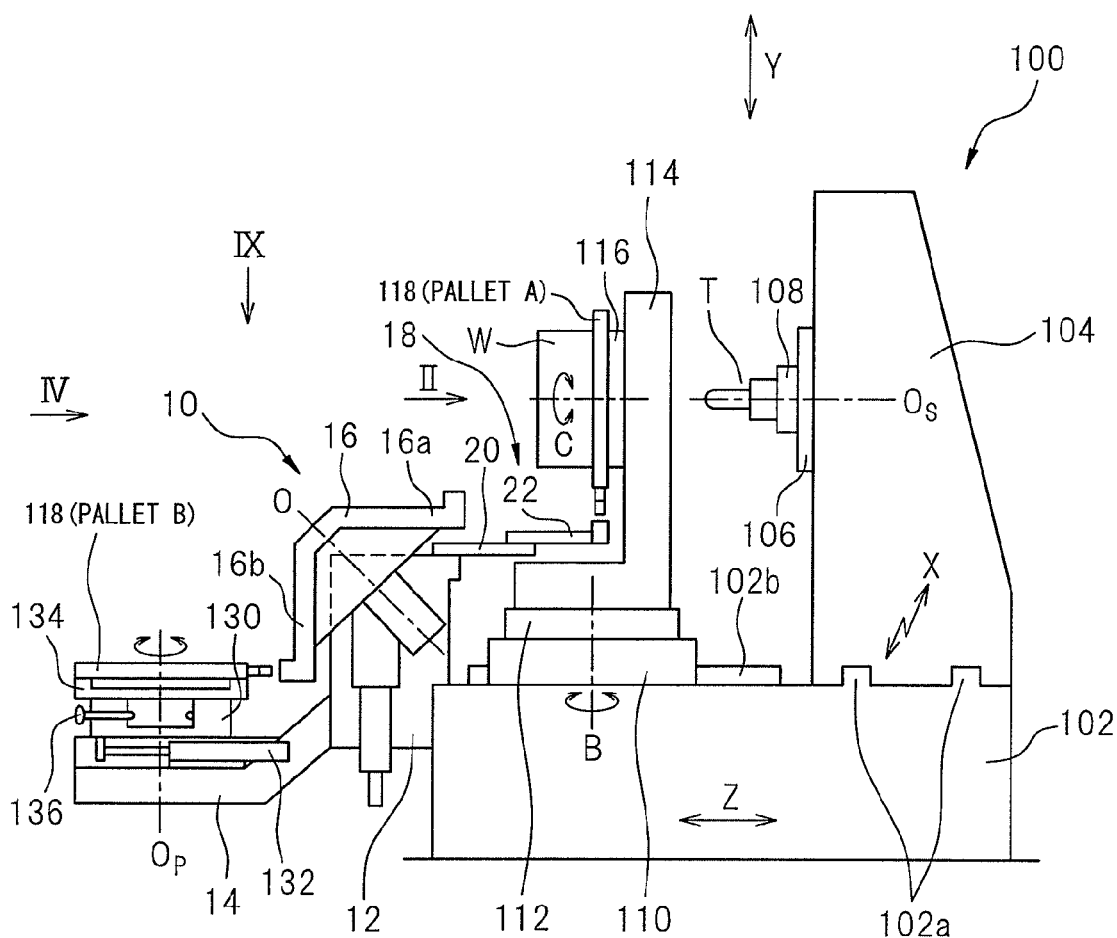
FIG. 1 is a side view illustrating a machining center according to an embodiment of the invention.

With reference to FIG. 1, a machine tool 100, provided with a pallet changer 10 according the embodiment of the invention, is a horizontal machine tool comprising a bed 102 adapted to be secured to a factory floor, a column 104 mounted to the top face of a rear part (the right side part in FIG. 1) of the bed 102 for moving in the left-right direction (X-axis direction) by an X-axis feed mechanism, a spindle head 106 mounted to the front surface of the column 104 for moving in the vertical direction (Y-axis direction) by a Y-axis feed mechanism and a B-axis base 110 mounted to the top face of a front part of the bed 102 for moving in the front-rear direction (Z-axis direction) by a Z-axis feed mechanism. A spindle 108 is supported by the spindled head 106 for rotation about a horizontal rotational axis Os. A tool T is attached to the end of the spindle 108. A B-axis table 112 is rotatably supported by the B-axis base 110 for angular range of ±180 degrees about a vertical axis (B-axis). A servomotor (not shown) is incorporated as a B-axis feed mechanism in the B-axis base 110.

The X-axis feed mechanism may include a pair of X-axis guide rails 102a horizontally extending in the left-right direction in the top face of the bed 102, guide blocks (not shown) mounted to a bottom face of the column 104 for sliding along the X-axis guide rails 102a, an X-axis ball screw (not shown) extending in the X-axis direction in the bed 102, a nut (not shown) mounted to the lower end portion of the column 104 so as to engage the X-axis ball screw and a servomotor, connected to an end of the X-axis ball screw, for driving the X-axis ball screw.

Similarly, the Y-axis feed mechanism may include a pair of Y-axis guide rails (not shown) vertically extending in the column 104, guide blocks (not shown) mounted to the spindle head 106 for sliding along the Y-axis guide rails, a Y-axis ball screw (not shown) extending in the Y-axis direction in the column 104, a nut (not shown) mounted in the spindle head 106 so as to engage the Y-axis ball screw and a servomotor, connected to an end of the Y-axis ball screw, for driving the Y-axis ball screw.

Similarly, the Z-axis feed mechanism may include a pair of Z-axis guide rails 102b horizontally extending in the top face of the bed 102 perpendicular to the X-axis guide rails 102a, guide blocks (not shown) mounted to a bottom face of the B-axis base 110 for sliding along the Z-axis guide rails 102b, a Z-axis ball screw (not shown) extending in the Z-axis direction in the bed 102, a nut (not shown) mounted to a bottom face of the B-axis base 110 so as to engage the Z-axis ball screw and a servomotor, connected to an end of the Z-axis ball screw, for driving the Z-axis ball screw.

Secured to the top face of the B-axis table 112 is a C-axis base 114, to which a C-axis table 116, having a vertical pallet mounting face, is mounted for rotation about a horizontally extending rotational axis, defining a C-axis. C-axis base 114 is incorporated with a servomotor (not shown) providing a C-axis feed mechanism for the C-axis table 116. A pallet A, to which a workpiece W is attached, is detachably secured to the pallet mounting face of the C-axis table 116. When the pallet A is secured to the pallet mounting face, a workpiece mounting face, defined by the pallet A, is aligned with the B-axis. The C-axis table 116 provides the table described in the claims.

Accordingly, the machine tool 100 is a machine tool having five feed axes of three orthogonal liner feed axes, i.e., X-axis, Y-axis and Z-axis, and two rotational feed axes, i.e., B-axis and C-axis. As described below, a first pallet changing position is defined on the Z-axis by the position of the B-axis table 112 where a pallet A is removed from the C-axis table, and a second pallet changing position is defined on the Z-axis by the position of the B-axis table where a pallet B is mounted to the C-axis table 116.

The pallet changer (APC) 10 comprises an APC base 12 (corresponding to the base of claim 6) which is secured to the front part (the left side part in FIG. 1) of the bed 102, a pallet loading station (PLS) 14, a changing arm 16 mounted to the APC base 12 for rotation about an inclined rotation axis O and for moving in the vertical direction and a traverser 18 for transporting the pallet A between the changing arm 16 and the C-axis table 116. The changing arm 16 is formed into substantially an L shape having two arm portions 16a and 16b. A pallet gripping parts 17 and a pallet engaging mechanism 50 are provided on each of the arm portions 16a and 16b at the end thereof. Further, the rotational axis O extends in a vertical plane, including the rotational axis Os of the spindle 108, upwardly from a horizontal axis by 45 degrees.

In the pallet loading station 14, a PLS table 130 reciprocally movable in the Z-axis, a hydraulic cylinder 132 providing means for moving the PLS table 130, a pallet mount 134 mounted to the PLS table 130 for rotation about a vertical axis Op, and an index pin 136 for locking the pallet mount 134 relative to the PLS table at a desired rotational position. The PLS table 130 is reciprocally movable between a preparation position shown by a pallet indicated by dash and dot line in FIG. 9 and a third pallet changing position shown by another pallet indicated by solid line. At the preparation position, an operator of the machining center 100 removes a processed workpiece from the pallet A and attaches a non-processed workpiece to the pallet B. At the third pallet changing position, the pallet B can be engaged with the second arm portion 16b of the changing arm 16, as described below.

Figure 2:
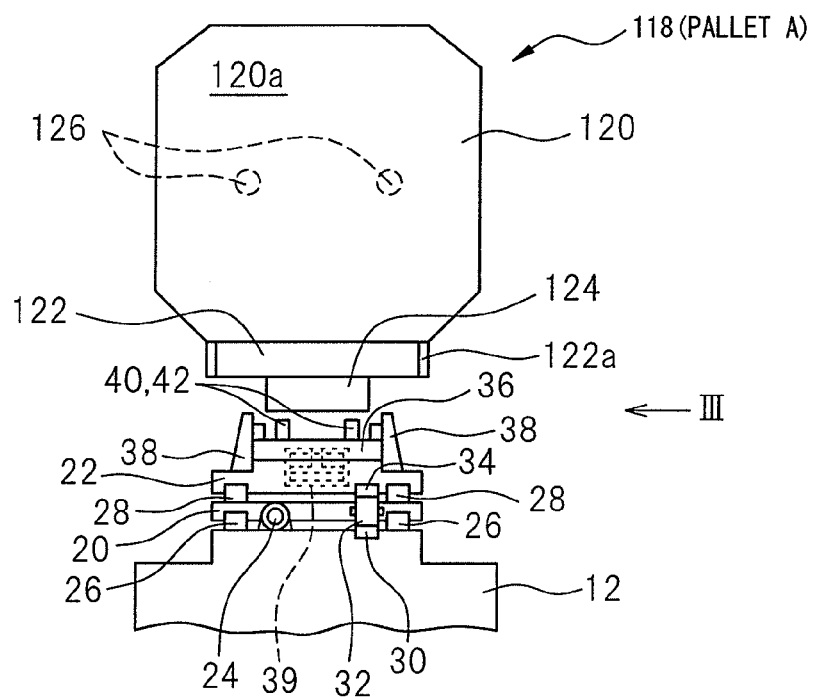
FIG. 2 is a front view of a pallet changer in the direction of arrow II in FIG. 1.
Figure 3:
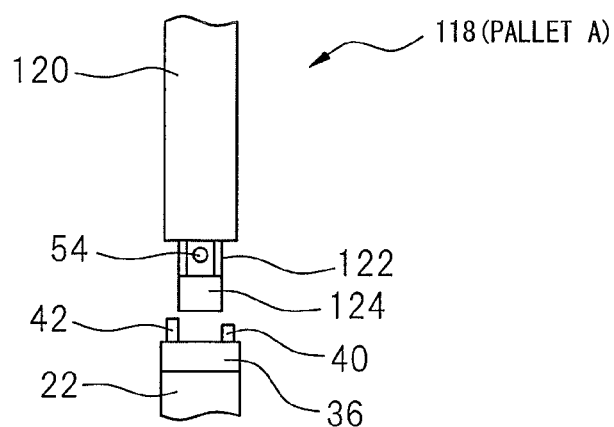
FIG. 3 is a side view of the pallet changer in the direction of arrow III in FIG. 1, showing pallet A and a pallet holder.

With reference to FIGS. 2 and 3, the pallet 118, to which a workpiece W is attached, comprises a body defining a workpiece attachment face 120a for attaching the workpiece W, a gripped member 122 laterally extending from one side of the body 120 and adapted to be engaged by the changing arm 16, a held member 124 laterally and outwardly extending further from the gripped member 122 and adapted to be engaged by a pallet holder 36 of the traverser 18, and pull studs 126 extending from the face of the body 120 opposite to the workpiece attachment face 120a and adapted to be engaged by a clamper (not shown) provided on the C-axis table 116. The pallet A is a pallet to which a processed workpiece W is attached and the pallet B is a pallet to which a non-processed workpiece W is attached.

The traverser 18 comprises first and second sliders 20 and 22 which are slidable along the top face of the traverser base which the top face is defined by the top end of the APC base 12, and hydraulic cylinder 24 providing an actuator for driving the first and second sliders 20 and 22. In particular, the first slider 20 is slidable along first rails 26 secured to the top face of the traverser base and extending in the Z-axis. The second slider 22 is slidable along second rails 28 secured to a top face of the first slider 20 and extending in the Z-axis. A first rack 30, extending in the Z-axis, is secured to the top face of the traverser. The first slider 20 has a pinion 32 engaging with the rack 30. Secured to a bottom face of the second slider 22 is a second rack 34 which also engages the pinion 32.

Disposed at the distal end of the second slider 22 are a pallet holder 36 which is vertically movable relative to the second slider 22 in order to engage with and disengage from the holder member 124 of the pallet 118, a hydraulic cylinder 39 for lifting and lowering the pallet holder 36 relative to the second slider 22, and a vertical guide 38 for guiding the lifting and lowering movement of the pallet holder 36. The pallet holder 36 is further provided with a plurality of holding pins 40 and 42 adapted to engage with the held member 124 of the pallet 118. The pallet holding pins 40 and 42 are offset from each other in the Z-axis direction, as shown in this embodiment, so that the pallet holding pins 40, located outside in FIG. 2, engage with the back side of the held member 124, while the pallet holding pins 42, located inside, engage the front side of the held member 124. Therefore, the pallet 118 is held by the pallet holder 36 by inserting the held member 124 between the pallet holding pins 40 and pallet holding pins 42.

Figure 4:
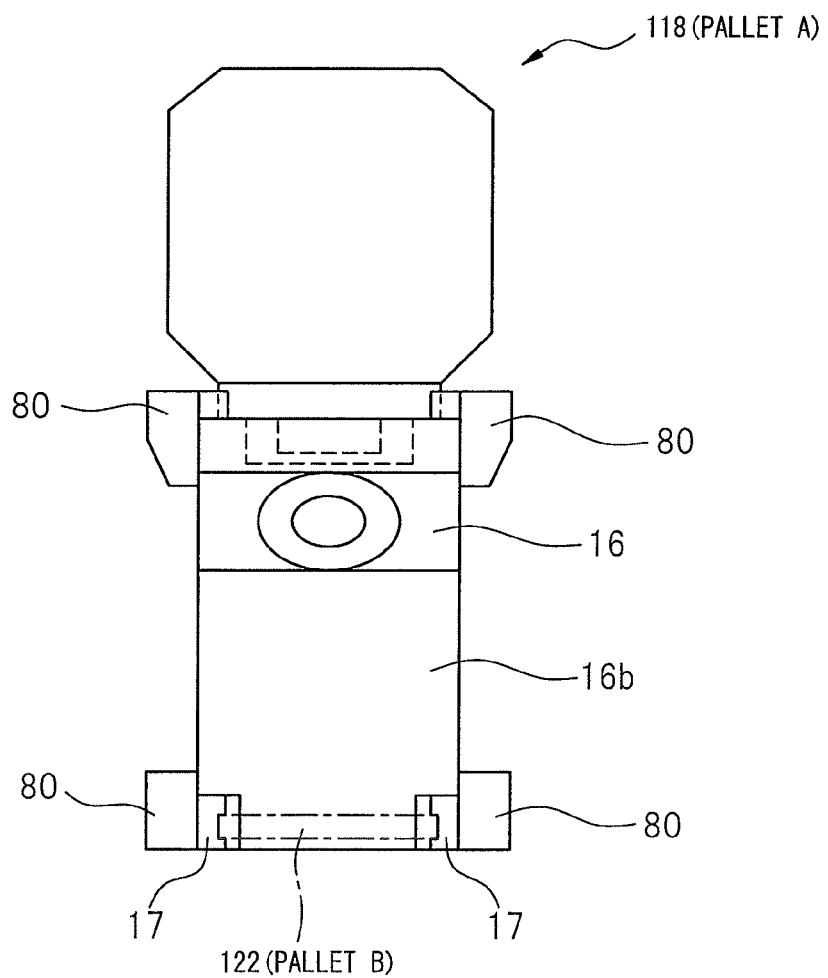
FIG. 4 is a front view of the pallet changer in the direction of arrow IV in FIG. 1.
Figure 5A:
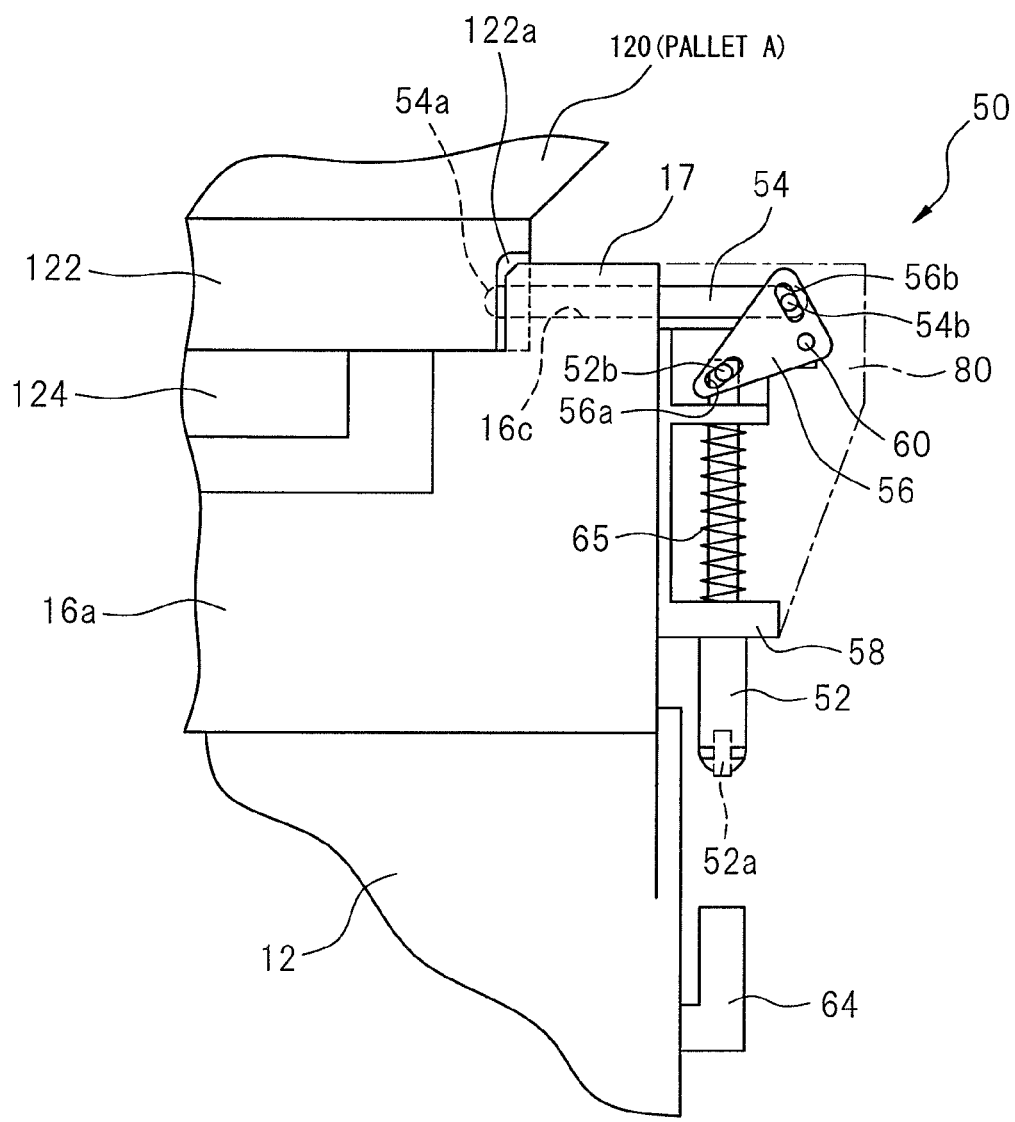
FIG. 5A is an enlarged view of a pallet gripping part of the pallet changer and a locking mechanism, showing a situation of the locking mechanism in which locking pins engage with a gripped member of the pallet.
Figure 5B:
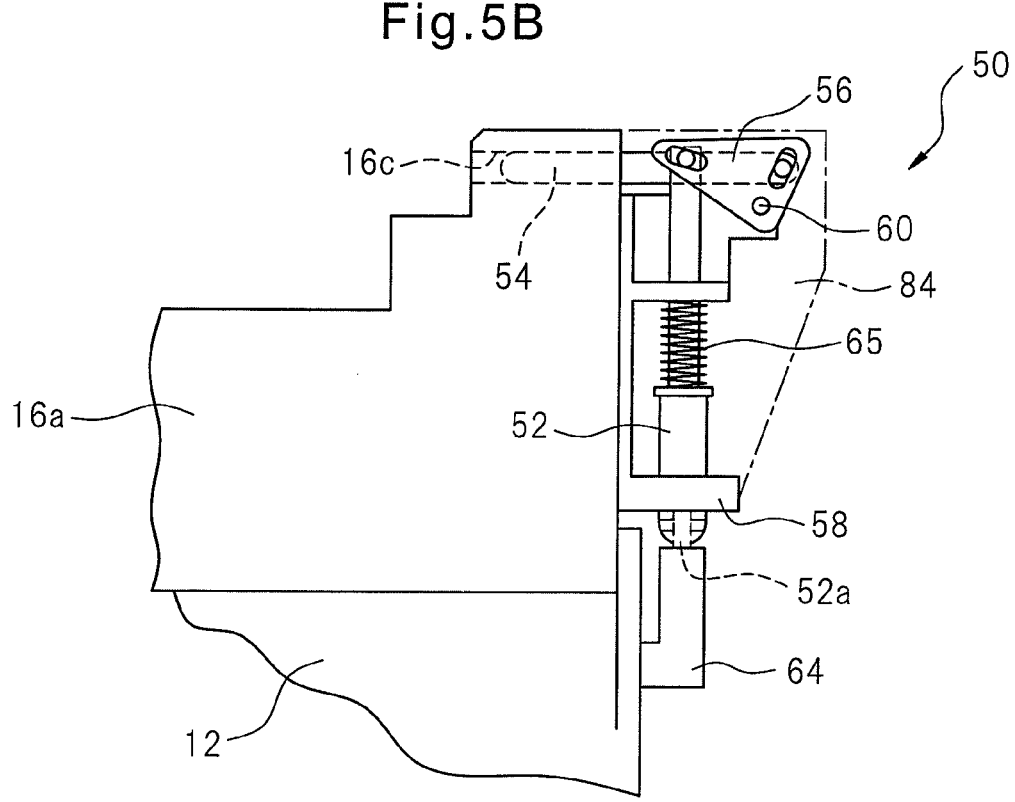
FIG. 5B is an enlarged view of a pallet gripping part of the pallet changer and a locking mechanism, showing a situation of the locking mechanism in which locking pins disengage from a gripped member of the pallet.
Figure 9:
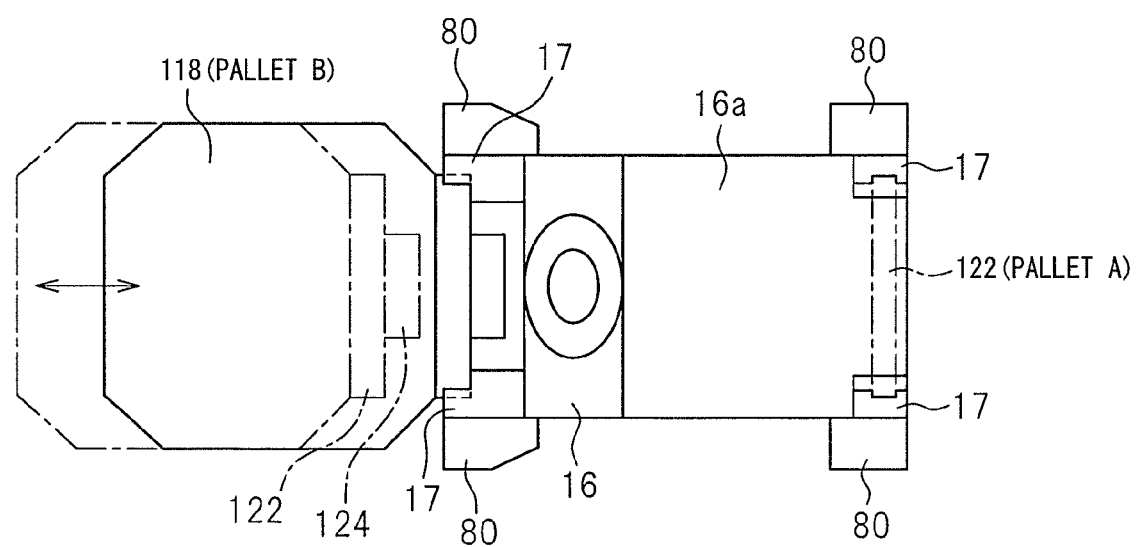
FIG. 9 is a plan view of the pallet changer in the direction of arrow IX in FIG. 1.

With reference to FIGS. 5A and 5B, at the distal end of the each arm portions 16a and 16b, a pallet gripping parts 17 is provided for gripping the pallet 118 by engaging with the gripped member 122. The gripped member 122 is provided with fitting portions 122a complementary to the pallet gripping parts 17. As shown in FIGS. 4 and 9, the fitting portions 122a disposed at the either end of the gripped member 122 is adapted to fit into C-shaped grooves defined in the pallet gripping parts 17. Further, pallet locking mechanisms 50, for preventing the gripped member 122 from disengage from the pallet gripped members, are disposed outside each of the pallet gripping parts 17.

The pallet locking mechanisms 50 comprise, as main elements, plungers 52, locking pins 54 and links 56 for operatively connecting the plungers 52 and the locking pins 54. On the side walls of the APC base 12, first dogs 64, which are adapted to be abutted by the plungers 52 when the arm portions 16a and 16b of the changing arm 16 are positioned at machine side position where they face the C-axis base 114, and second gods which are adapted to be abutted by the plungers 52 when the arm portions 16a and 16b of the changing arm 16 are positioned in the pallet loading station. The second dogs 78 have an inclined face 78a.

The plungers 52 are reciprocably held by brackets 58 mounted to the sides of the arm portions 16a and 16b of the changing arm 16 at the distal ends thereof. The plungers 52 have rollers 52a mounted at their ends facing the first dogs 64, pins 52b disposed at the opposite ends so as to engage slots 56a of the links 56 and coil springs 65 disposed around the plungers 52 for biasing the plungers 52 toward the first dogs 64.

The locking pins are oriented substantially perpendicular to the plungers 52 within locking pin holes 16c formed in the arm portions 16a and 16b. Further, the locking pins 54 are reciprocably disposed in the locking pin holes 16c so that their end portions 54a can engage with and disengage from engaging holes formed in the sides of the gripped member 122 of the pallet 118. At the rear ends of the locking pins 54, pins 54b are provided to engage slots 56b of the links 54. The links 56 define the slots 65a engaging the pins 52b of the plungers 52 and the slots 56b engaging the pins 54b of the locking pins 54, and are mounted to the brackets 58 for rotation about pivots defined by pins 60. Therefore, the pallet locking mechanisms 50 are preferably enclosed by covers 80.

Figure 6:
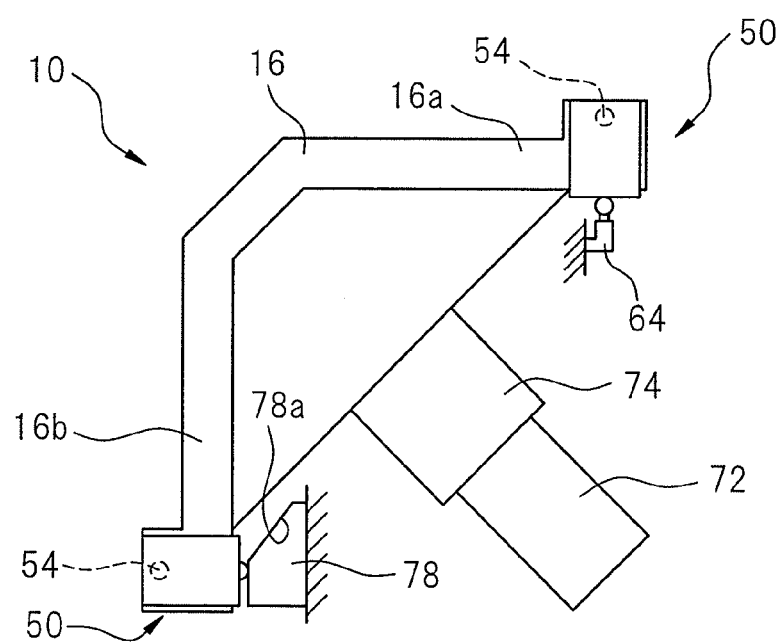
FIG. 6 is a side view of the changing arm.
Figure 7:
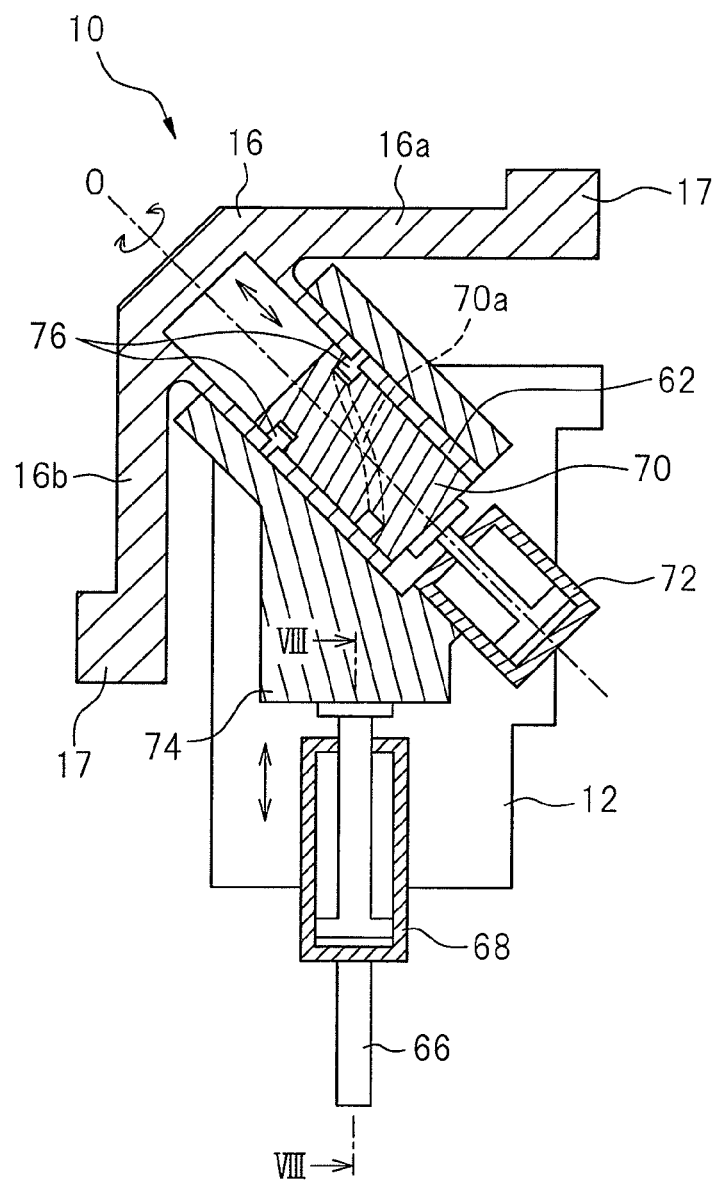
FIG. 7 is a sectional view of the changing arm shown with changing arm driving means.
Figure 8:
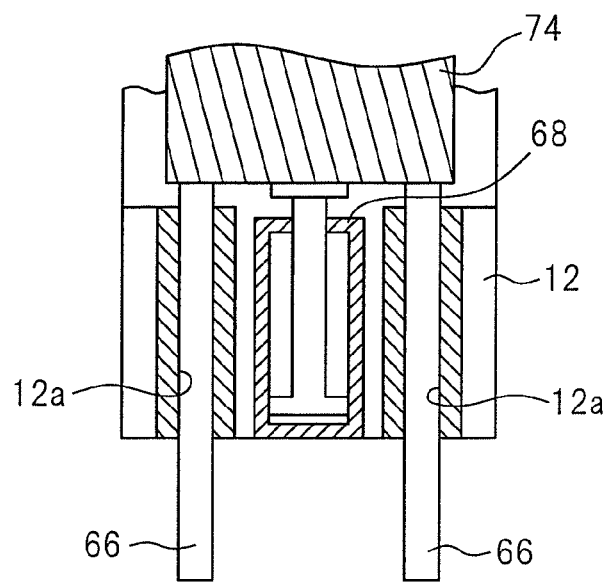
FIG. 8 is a partially sectional view along line VIII-VIII in FIG. 7.

With reference to FIGS. 6 and 7, the changing arm 16 has the arm portions 16a and 16b which are perpendicular to each other and a sleeve portion disposed between the arm portions 16a and 16b. The sleeve portion 62 is rotatably mounted to a cam base 74. The cam base 74 has a vertical guide 66 disposed within a guide hole 12a defined in the APC base 12 whereby the cam base is mounted to the APC base 12 for lifting and lowering motion in the Y-axis direction by a hydraulic cylinder 68 providing lifting and lowering means.

Provided within the sleeve portion 62 is a cylindrical cam 70 which provides rotation means for rotating the changing arm 16. A hydraulic cylinder 72, providing cam driving means for reciprocating the cylindrical cam 70 along the rotation axis O within the sleeve portion 62, is mounted to the cam base 74. At least one cam groove 70a is provided in the outer surface of the cylindrical cam 70, while at least one cam follower 76, engaging the cam groove 74, is disposed in the inside surface of the sleeve portion. Accordingly, the liner motion of the hydraulic cylinder 72 is converted into the rotation of the changing arm 16.

Figure 10A:
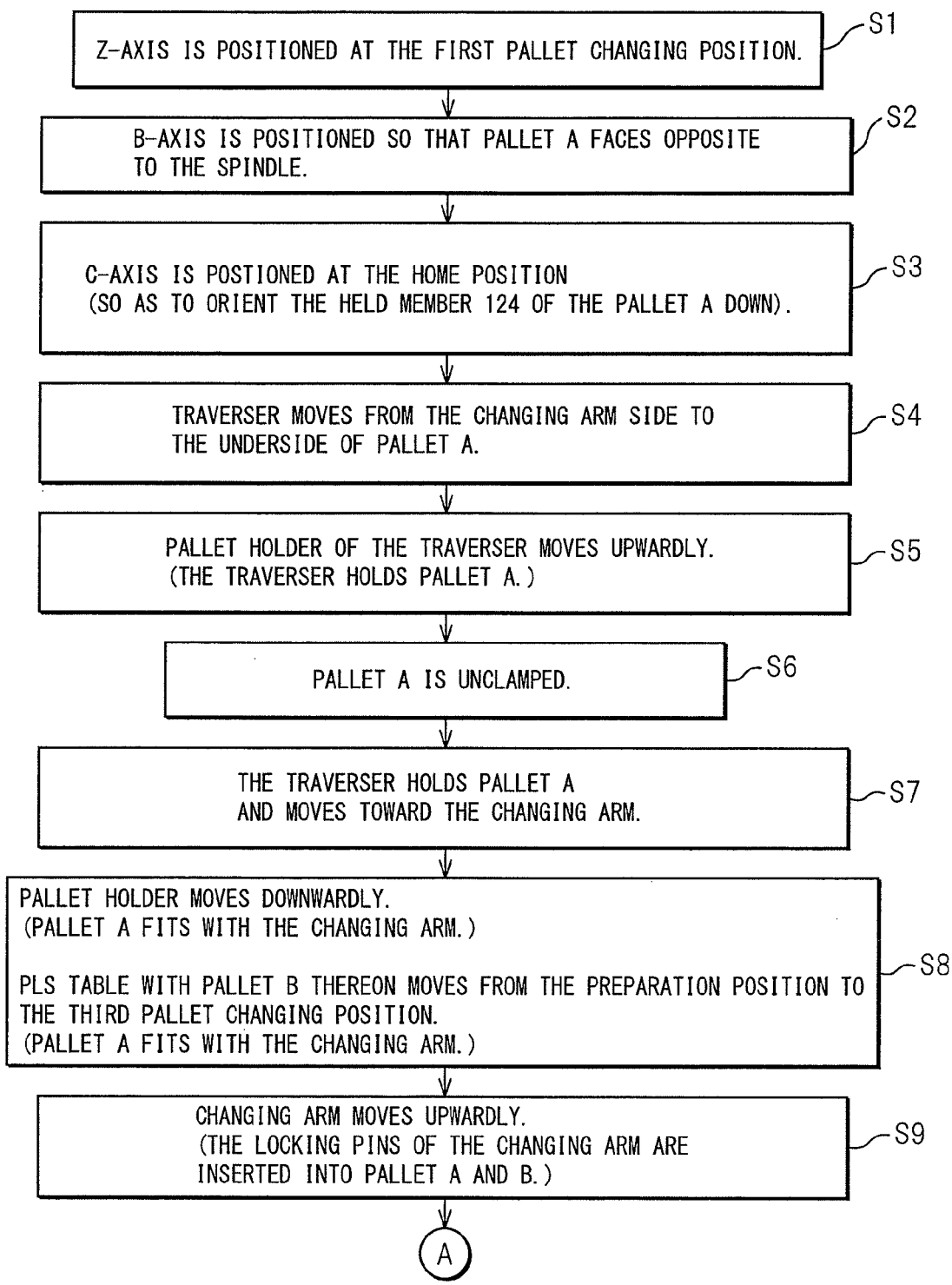
FIG. 10A is a flow chart explaining the pallet changing operation of the pallet changer.
Figure 10B:
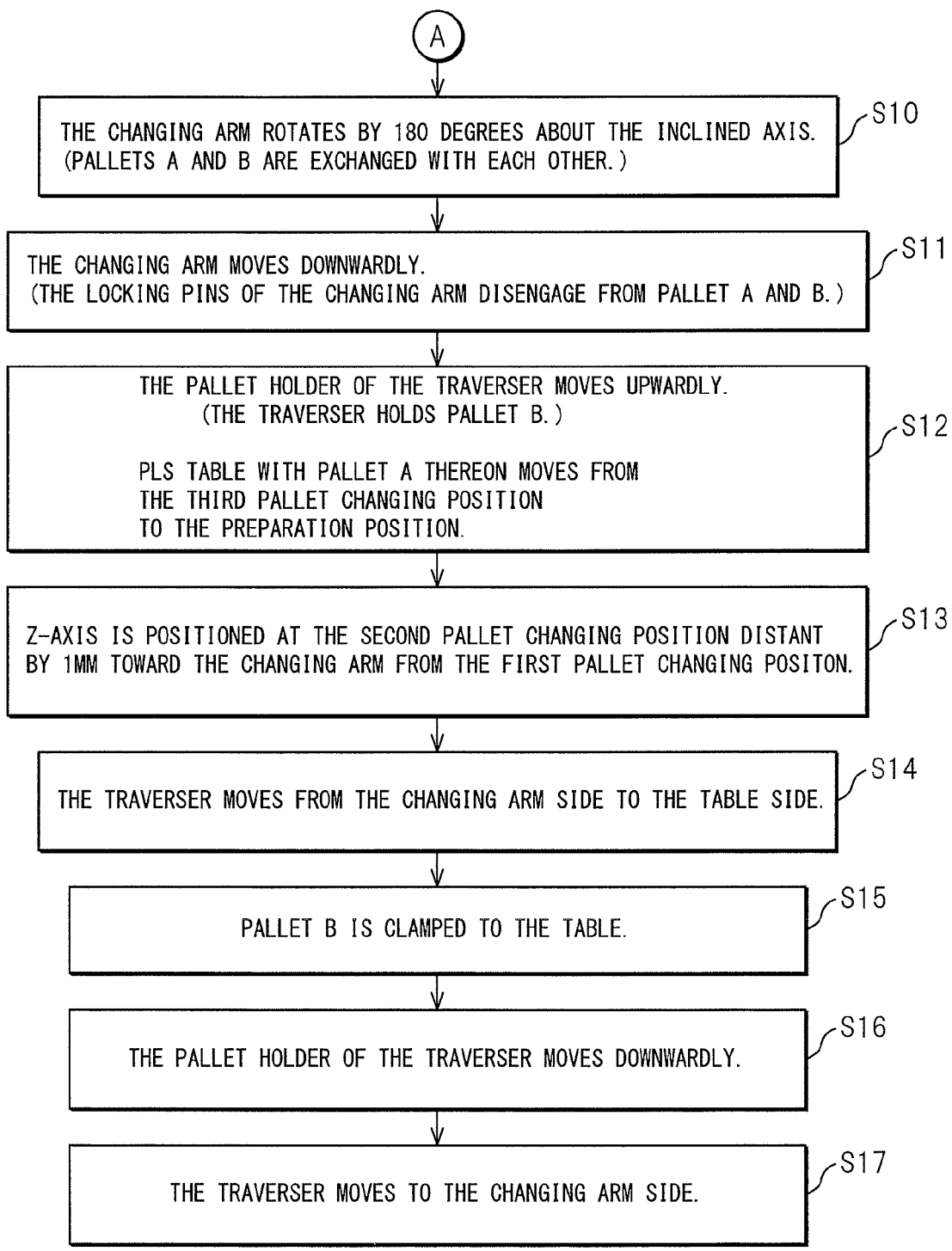
FIG. 10B is a flow chart explaining the pallet changing operation of the pallet changer.

With reference to flow charts, illustrating the pallet changing operation of the pallet changer, shown in FIGS. 10A and 10B, the functional operation of the pallet changer of the present embodiment will be described below.

When the machining center 100 complete the process on the workpiece W, the B-axis base 110 moves apart from the column 104 in the Z-axis direction to the first pallet changing position (step S1). The B-axis table rotates so that the pallet A, mounted to the C-axis table 116, faces opposite to the spindle 108 (step S2). The C-axis table 116 rotates to the home position so as to orient the held member 124 of the pallet A down (step S3).

The traverser 18 extends so as to position the pallet holder 46 under the held member 124 (step S4). The hydraulic cylinder 39 of the pallet holder 36 lifts the pallet holder 36 so as to insert the held member 124 between the pallet holding pins 40 and pallet holding pins 42 whereby the pallet A is held (step S5). The pallet A is unclamped by disengaging the clamper of the C-axis table 116 (step S6). The traverser 18 is retracted with the pallet A is held by the pallet holder 36 so as to move the pallet A toward the arm portion 16a. Then, the hydraulic cylinder 39 moves the pallet holder 36 downwardly whereby the gripped member 122 of the pallet A is fitted with the pallet gripping parts 17. At the same time, the PLS table 130 with the pallet B mounted, to which a non-processed workpiece is attached, moves toward the changing arm 16 to the third changing position whereby the gripped member 122 is fitted with the pallet gripping parts 17 of the arm portion 16b of the changing arm 16, the arm portion being positioned in the pallet loading station (step S8).

Then, the hydraulic cylinder 68 lifts the cam base 74. Accordingly, the changing arm 16 moves upwardly so that the plunders 52 of the locking mechanisms 50 of the arm portion 16a at the machine side position move apart from the first dogs 64 whereby the locking pins 54 engage the gripped member 122. At the same time, the plunger 52 of the locking mechanisms 50 of the arm portion 16, in the pallet loading station 14, move along the inclined face 78a and apart from the second dogs 78 whereby the locking pins 54 engage the gripped member 122 of the pallet B (step S9).

By linearly moving the cylindrical cam 70 along the inclined rotation axis O with the hydraulic cylinder 72, the changing arm 16 is rotated by 180 degrees about the inclined rotation axis O by the engagement between the cam groove 70a of the cylindrical cam 70 and the cam follower 76, whereby the pallet A and pallet B are exchanged with each other (step S10). Meanwhile, the gripped members 122 of the pallets A and B are biased against the arm portions 16a and 16b by the gravity applied to the pallets A and B, except when the pallet B is horizontally oriented in the pallet loading station 14. Therefore, according to the present embodiment, the pallets A and B cannot be disengaged from the pallet gripping parts 17 even if the engagement between the locking pins 54 of the locking mechanisms 50 and the gripped members 122 is insufficient for some reason.

Then, the hydraulic cylinder 68 moves downwardly the cam base 74 along with the changing arm 16 so that the plungers 52 of the arm portion 16 abut the first dogs 64 whereby the locking pins 54 move apart the gripped member 122 of the pallet B, while at the same time the plungers 52 of the arm portion 16b move along the inclined face 78a whereby the locking pins 54 move apart from the gripped member 122 of the pallet A (step S11).

The hydraulic cylinder 39 of the traverser 18 lifts the pallet holder 36 whereby the held member 124 of the pallet B is held by the pallet holder 36. At the same time, in the pallet loading station 14, the hydraulic cylinder 132 moves the PLS table 130, with the pallet A mounted thereto, from the third pallet changing position to the preparation position (step S12). At the preparation station, an operator of the machining center 100 detaches the processed workpiece from the pallet A in exchange with a non-processed workpiece.

Then, the B-axis base 110 is moved in the Z-axis direction slightly, for example 1 mm, from the first pallet changing position toward the changing arm 16 to the second pallet changing position (step S13). Then, the traverser 18 extends so that the pallet B with the non-processed workpiece attached thereto is moved to the C-axis table 116 (step S14). By engaging the clamper (not shown) of the C-axis table 116, the pallet B is clamped to the C-axis table 116 (step S15). Then, the pallet holder 36 of the traverser 18 moves downwardly (step S16), and the traverser 18 returns to the changing arm 16 side whereby the sequence of the pallet changing operation is completed.

In relation to step S13, in the present invention, the upper end of the pallet B will leans slightly toward the changing arm 16, because the pallet holder 36 holds the held member 124 of the pallet B by inserting it between pallet holding pins 40 and the pallet holding pins 42. Therefore, at the first pallet changing position (theoretical position on the Z-axis where the pallet holder can hold the pallet A with the maximum extension of the traverser 18), insufficient clamp may result because the pull studs 126 are not fully inserted into the clamper due to a small gap formed between the pallet B and the C-axis table 116. Therefore, in step S13, by moving slightly the B-axis base 110 toward the changing arm 16 to the second pallet changing position along the Z-axis, the traverser 18 pushes the pallet B to the C-axis by a small distance, for example 1 mm, so that the formation of gap between the pallet B and the C-axis table 116 is avoided whereby the clamping operation can be securely carried out. On the other hand, in unclamping operation, the pallet is vertically secured to the C-axis table 116, and therefore such an operation is not required.

The traverser 18 is formed of a double speed mechanism, so that the traverser is enclosed in the changing arm 16 on standby, while it has a long stroke by extending. The pallet holder 36 disposed at the distal end of the traverser 18 has a simple configuration having the pallet holding pins 40 and 42 between which the gripped member 124 of the pallet 118 is inserted. Therefore, the traverser 18 can extend farther into a narrow space.

A machine tool having a deep table, similar to the present embodiment in which the workpiece attachment face 120a of the pallet 118 is aligned with the B-axis, has advantages of compact machine size and accessibility to the pallet 118. Further, it is possible to convey the pallet 118 toward the C-axis table 116 with the pallet oriented to face the C-axis table. Therefore, the pallet can be formed of a simple plate having only the pull studs so that it is possible to reduce its thickness and weight whereby the pallet is not required to be formed into a complex configuration such as the pallet of Patent Document 1. Further, the provision of the traverser 18 avoids the necessity to move the changing arm 16 reciprocally in the Z-axis unlike Patent Document 1, and therefore the changing arm 16 can be a compact rotary arm.

The pallet locking mechanism 50 works with the lifting and lowering movements of the changing arm 16, and therefore it is not required to provide two actuators at the either end of the changing arm for locking the pallets.

Further, the provision of the cylindrical cam 70 in the mechanism for rotating the changing arm 16 reduces the size of the pallet changer 10. The PLS table 130 is provided for reciprocal movement in the pallet station 14 so that when the pallet 118 moves from the third pallet changing position to the preparation position, the pallet gripping part 17 and the gripped member are disengaged from each other whereby the pallet can be held at any rotational position during the preparation of a workpiece, thus the preparation work is facilitated.

The pallet holder 36 may have a gripper including an additional actuator for gripping the gripped member 124 at the front and rear faces thereof, instead of the configuration of the pallet holding pins 40 and 42 between which the gripped member is inserted.

According to the present invention, the pallet loading station 14 is disposed at the left side in FIG. 1. However, the pallet changer 10 may be provided with a pallet station 14 disposed at one of the distal and proximal sides in the direction perpendicular to the plane of FIG. 1, and a inclined axis O extends in a vertical plane including X-axis upwardly from the horizontal axis by 45 degrees. Further, the machine tool may be of a vertical type. Although the table is provided with the C-axis table 116 rotatable about C-axis in the embodiment, a fixed-type table may be employed.

The invention claimed is:

1. A pallet changer for changing pallets between a table in which when a pallet having a major surface is mounted thereto, the major surface extends in a plane parallel to a vertical axis, and a pallet loading station in which when the pallet is held thereon, the major surface extends in a plane parallel to a horizontal axis, comprising:

the major surface configured to have a workpiece clamped thereto;

a changing arm provided for rotation between the table and the pallet loading station about a rotational axis upwardly inclined relative to the horizontal axis by 45 degrees; and two arm portions, each provided at a respective one of two opposite ends of the changing arm, each of the two arm portions configured for gripping a gripped member of the pallet, the gripped member protruding from a lowermost surface of the pallet when the pallet is mounted to the table such that the major surface is oriented so as to extend in the plane parallel to the vertical axis.

2. The pallet changer according to claim 1, further comprising a pallet gripping part provided at each arm portion of the changing arm, each gripping part being complementarily formed to the gripped member for fitting therewith.

3. The pallet changer according to claim 2, wherein the pallet gripping parts open vertically upward when the arm portions are positioned adjacent the table in a table side position, and open horizontally when the arm portions are positioned in the pallet loading station.

4. The pallet changer according to claim 2, wherein the changing arm further comprises locking mechanisms for preventing the gripped member of the pallet from disengaging from a corresponding pallet gripping part when the corresponding pallet gripping part engages the gripped member of the pallet.

5. The pallet changer according to claim 4, wherein the locking mechanisms comprise:

plungers provided at sides of the arm portions of the changing arm;

a locking pin oriented perpendicular to each of the plungers so as to engage with and disengage from the gripped member of the pallet;

links operably connecting the corresponding plungers and locking pins;

first dogs provided for abutment with abutment ends of the plungers when the plungers are adjacent the table in a table side position; and second dogs provided for abutment with the abutment ends of the plungers when the plungers re in the pallet loading station; wherein the plungers move apart from the dogs when the changing arm is lifted whereby a given locking pin engages the gripped member, and the plungers abut the dogs when the changing arm is lowered whereby the given locking pin disengages from the gripped member.

6. The pallet changer according to claim 1, further comprising a traverser for conveying the pallet between the arm portion, which is positioned adjacent the table in a table side position, and the table.

7. The pallet changer according to claim 6, wherein the traverser comprises a first slider reciprocable in a horizontal direction relative to the arm portion that is positioned adjacent the table in the table side position, a second slider reciprocable in the horizontal direction relative to the first slider, and a pallet holder for engagement with a held member, which protrudes from the gripped member.

8. The pallet changer according to claim 7, wherein the traverser comprises a double speed mechanism including:

a traverser base secured to a base;

a first rack secured to a top face of the traverser base, the first rack having a plurality of teeth;

a pinion mounted to the first slider and having a plurality of teeth engaging the teeth of the first rack; and a second rack secured to a bottom face of the second slider, the second rack having a plurality of teeth engaging the teeth of the pinion.

9. The pallet changer according to claim 7, wherein the pallet holder of the traverser comprises a plurality of vertically extending pins for engaging the held member.

10. The pallet changer according to claim 1, further comprising:

rotation means for rotating the changing arm about the inclined axis; and lifting and lowering means for vertically moving the changing arm along with the rotation means.

* * * * *